Nov. 15, 1949     J. S. VOIGT     2,488,044

BLOCKER

Filed Nov. 7, 1945

JOHNSTON STUART VOIGT
INVENTOR.

BY Carl J. Barbee

HIS ATTORNEY.

Patented Nov. 15, 1949

2,488,044

UNITED STATES PATENT OFFICE 2,488,044

BLOCKER

Johnston Stuart Voigt, Kenosha, Wis., assignor to Nash-Kelvinator Corporation, Kenosha, Wis., a corporation of Maryland Application November 7, 1945, Serial No. 627,245

13 Claims. (Cl. 192—53)

This invention relates to power transmissions and more particularly to automotive transmissions having a plurality of gear ratios in which a blocker is utilized to prevent engagement of gears when they are not in synchronism.

It is an object of this invention to provide a power transmission for an automobile wherein intermediate or direct gear cannot be provided unless the gears engageable to provide said ratios are in synchronism.

It is a further object of this invention to provide a power transmission for an automobile utilizing a blocker for preventing engagement of gears which are not in synchronism which is economical to manufacture.

It is another object of this invention to provide an automotive transmission having a blocker to prevent engagement of gears when not in synchronism, the use of which will not require any substantial changes in the parts of the ordinary automotive transmission.

It is another object of this invention to provide an automotive transmission wherein is embodied the use of a blocker which is easy to install or replace and which will require very little, if any, attention after assembly.

Other objects and advantages of this invention will be apparent from a consideration of the following description, claims and the attached drawings, of which there are one sheet, and in which:

Figure 1:
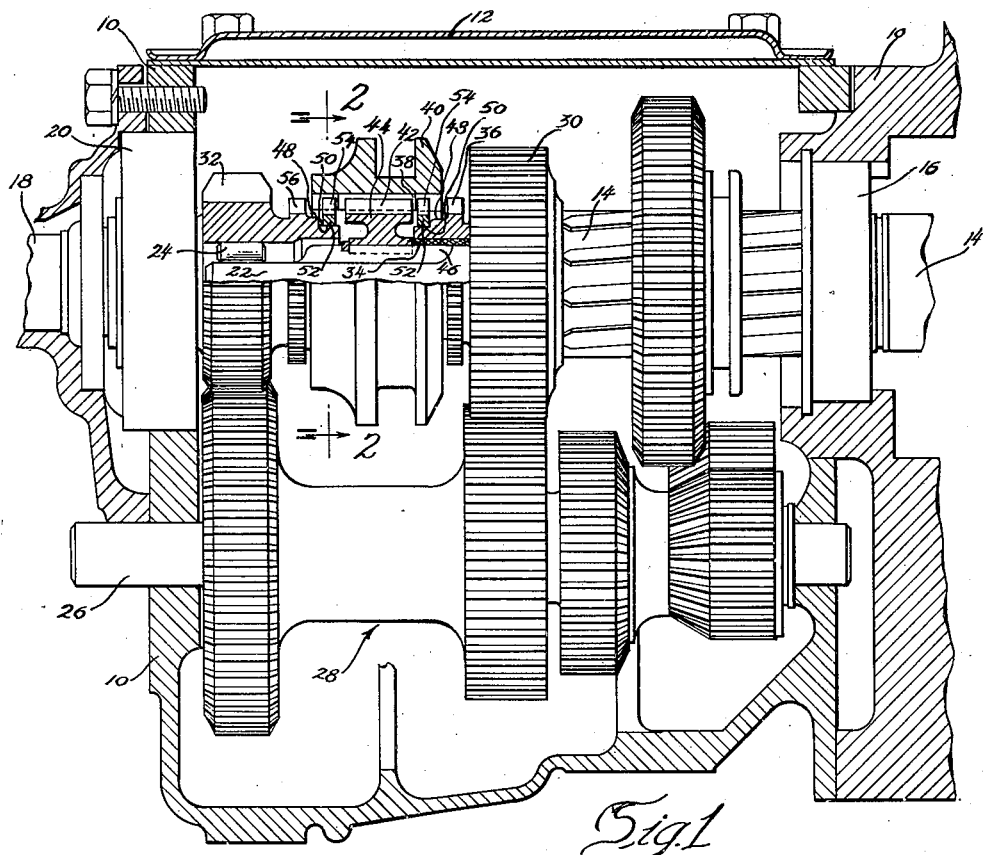
Figure 1 is a side elevation of an automotive transmission partially in section.

Referring in detail to the figures, in which like numbers are used throughout to indicate like parts, in Figure 1 is shown a transmission case 10 provided with a cover 12. The transmission within case 10 comprises a main shaft 14 journaled in a bearing 16 which is mounted in the rearward side of case 10. The clutch shaft 18 is journaled in a bearing 20 which is mounted in the forward side of case 10. The main shaft and clutch shaft of the transmission are parallel and in axial alignment. The forward end 22 of main shaft 14 is journaled in roller bearings 24 in a blind hole formed in the rearward end of clutch shaft 18.

A countershaft 26 is secured in apertures in the wall of case 10 parallel to the main shaft and the clutch shaft. Rotatively supported upon countershaft 26 is the usual countershaft gear cluster generally indicated at 28, one of the gears of which is in constant mesh with gear 30, which is rotatively supported upon the main shaft 14. Another gear of gear cluster 28 is in constant engagement with gear 32, which is formed on clutch shaft 18 within case 10 immediately behind bearing 20.

Gear 30 is rotatively carried on main shaft 14 by a sleeve 34 of bearing material. Formed on gear 30 is an intermediate clutch gear 36 designed to be engaged by the internal teeth 38 of clutch collar 40. The internal teeth 38 of collar 40 are in constant engagement with external teeth 42 formed on hub 44 which is telescopically positioned on main shaft 14 and in splined engagement with splined portion 46 of shaft 14.

Immediately forward of gear 36 is formed a first reduced portion 48 on gear 30 and immediately forward of portion 48 is formed a second reduced portion 50. Telescopically positioned on second reduced portion 50 is a snap ring 52 having a lug 54 formed thereon.

Formed on clutch shaft 18 is a clutch gear 56 which is designed, as is gear 36, to be engaged by the teeth 38 of collar 40. Rearwardly of gear 56 is formed a first reduced portion 48 identical to that formed on gear 30. Immediately rearwardly of portion 48 of gear 32 is formed a second reduced portion 50 identical to that formed on gear 30. A snap ring 52 identical to that telescopically positioned on portion 50 of gear 30 is likewise positioned on portion 50 of gear 32. This second named snap ring 52 is provided with a lug 54 identical to that of first named snap ring 52.

Figures 2, 3:
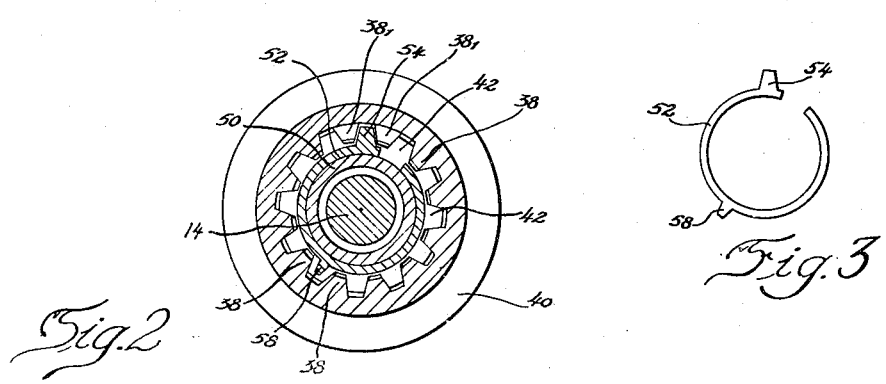
Figure 2 is a sectional view taken along line 2—2 of Figure 1 and looking in the direction of the arrows.
Figure 3 is a side elevation of a blocker ring.

Shown in Figure 2 is a cross sectional view taken along lines 2—2 of Figure 1 more clearly illustrating the snap rings 52 and the use to which they are put. A second view showing the snap ring 52 as associated with gear 30 is not shown in the belief that the views would be so nearly identical that it is unnecessary to provide a second view.

It will be noted in Figures 1 and 2 that the lug portion 54 of snap ring 52 extends radially outwardly into the path of the axial movement of teeth 38, which would tend to block any such axial movement. However, lug 54 is designed in such a manner that it will pass between the teeth 38' of the series of teeth 38. It will be noted in Figures 1 and 2 that teeth 38' have been shortened on their forward and rearward ends to permit the positioning of lug 54 within the series of teeth 38 and still not be in engagement with the teeth 38'.

The snap ring 52, being in frictional engagement with portion 50 of gear 32, will be rotated therewith so that lug 54 will be moved in front of one of the teeth 38' when they are in neutral position as shown in Figure 1.

If the operator desires to move teeth 38 into engagement with teeth 56, the forward face of the tooth 38' will strike lug 54, thus preventing the shifting of the teeth 38 into engagement with the gear 56. To permit shifting of the teeth into such engagement, the operator must reduce the speed of gear 32 by decelerating the engine so that collar 40 will turn slightly faster and slightly overrun gear 32 to bring teeth 38' into the position shown in Figure 2 in regard to lug 54, wherein said lug will pass between the teeth 38'. In this manner lug 54 will prevent the shifting of collar 40 into engagement with gear 56 as long as driving gear 32 is rotating at a faster speed than collar 40. However, when collar 40 rotates faster than gear 32 to bring the space between teeth 38' into alignment with lug 54, the shifting of collar 40 may be completed. In a like manner lug 54 will block one of teeth 38' when collar 40 is rotating at a much greater speed than gears 36 and 56 as collar 40 will move one of the teeth 38' in front of lugs 54 if said collar is rotated at a much greater speed than gear 56. Thus it will be seen that the use of blocker ring 52 necessitates synchronism of these gears before they may be meshed.

The same method of operation applies to the blocker and other structures on the rearward side of collar 40 when said collar is moved rearwardly toward engagement with gear 36. In such a case, gear 30 is usually traveling at a greater speed than collar 40 as it is in driving engagement with clutch shaft 18 and thus will carry lug 54 of the rearmost snap ring 52 in front of one of the teeth 38'. Upon momentary deceleration of the motor to reduce the speed of clutch shaft 18 and gear 30, lug 54 will be moved back into alignment with the space between the teeth 38' and be received therein to permit collar 40 to engage gear 36.

It will be noted in Figure 2 that snap ring 52 is further provided with a second lug 58 which is constantly positioned between two of the teeth 38 to limit the rotation of lug 54 so that it does not pass one of the teeth 38' to become aligned with the space between said tooth 38' and an adjacent tooth 38 and thus permit the shifting of the collar 40. Lug 58 is rotatable to the limits provided by the faces of the adjacent teeth 38.

In this manner, applicant has provided a new and useful blocker for a power transmission.

While this invention has been described in considerable detail, this description is not to be taken as limiting the invention in any manner. All equivalents falling within the scope of the attached claims are expressly reserved.

What is claimed is:

1. In a power transmission, a drive mechanism, a gear formed on said drive mechanism, a driven shaft, a toothed shiftable member drivingly associated with said driven shaft and adapted to directly engage said gear, a blocker member mounted in frictional engagement with said drive mechanism and adapted to block movement of said shiftable member toward engagement with said gear, and radially extending means formed on said blocker member for cooperating with the teeth of said shiftable member to limit rotation of the blocker member.

2. In a power transmission, a drive mechanism, a gear formed on said drive mechanism, a driven shaft, a toothed member drivingly associated with said driven shaft and axially movable into direct engagement with said gear, a blocker member positioned on said drive mechanism in frictional driving engagement therewith for blocking movement of said toothed member toward engagement with said gear, and a lost motion connection between said blocker member and the teeth of said toothed member and formed on said blocker member for limiting the rotation thereof in relation to said toothed member.

3. In a power transmission, a drive mechanism, a gear formed on said drive mechanism, a driven shaft, a toothed member drivingly associated with said driven shaft and axially movable into direct engagement with said gear for driving said driven shaft, a blocker member positioned on said drive mechanism in frictional engagement therewith and adapted to permit movement of said toothed member into engagement with said gear when the speeds of rotation of said member and gear are substantially equal, and radially extending means formed on said blocker member and designed to limit rotation of said blocker relative to said toothed member by engaging said teeth thereof.

4. In a power transmission, a drive mechanism, a gear formed on said drive mechanism, a driven shaft, a toothed member drivingly associated with said driven shaft and axially movable into direct engagement with said gear, a blocker member secured on said drive mechanism in frictional driving engagement therewith and adapted to be directly engaged by said toothed member and permit the same to be moved into engagement with said gear when the speeds of said toothed member and gear are substantially equal, and radially extending means formed on said blocker member designed to co-act with adjacent teeth of said toothed member to limit rotation of said blocker in relation thereto.

5. In a power transmission, a drive mechanism, a gear formed on said drive mechanism, a driven shaft, a toothed member positioned around the driven shaft in driving association therewith and axially movable into driving engagement with said gear, a plurality of shortened teeth on said toothed member, a snap ring positioned on said drive shaft within the periphery of said toothed member, a blocker tooth formed on said ring and positioned adjacent said shortened teeth and adapted to pass therebetween when the rotative speeds of the drive mechanism and the driven shaft are substantially equal, and radially extending means formed on said ring and designed to form a lost motion connection between said ring and said toothed member for limiting the rotation of said blocker tooth in relation to said toothed member.

6. In a power transmission, a drive mechanism, a gear formed on said drive mechanism, a driven shaft, a toothed member drivingly associated with said driven shaft and axially movable into direct engagement with said gear, a plurality of shortened teeth on said toothed member, a blocker means for said toothed member comprising a snap ring positioned on said drive mechanism within the periphery of said toothed member, a tooth formed on said ring between said shortened teeth and said gear and adapted to be rotated in front of said teeth to block axial movement thereof, and a radially extending lug formed on said ring and positioned between two teeth of said toothed member.

7. In a power transmission, a drive mechanism, a gear forming a part of said drive mechanism, a driven mechanism, a toothed member forming a part of said driven mechanism axially movable into direct engagement with said gear, shortened teeth formed on said toothed member, a blocker for controlling axial movement of said member comprising a snap ring positioned on a portion of said drive mechanism, a first tooth formed on said snap ring designed to be moved in front of said shortened teeth, and a second tooth formed on said ring and adapted to move between two teeth of the toothed member for limiting the movement of said first tooth.

8. In a power transmission, a drive mechanism, a gear formed on said drive mechanism, a driven mechanism, a toothed member forming a part of said driven mechanism and axially movable into direct engagement with said gear, a pair of teeth of said toothed member being shortened at their ends, a blocker mounted on said drive mechanism between said gear and said toothed member of said driven mechanism and comprising a snap ring positioned on a portion of said drive mechanism, a first tooth formed on said snap ring and designed to selectively rotate around the axis of the drive mechanism to block axial movement of said shortened teeth or mesh therewith, and a second tooth formed on said ring designed to move between two teeth of the toothed member to limit the rotation of said first tooth.

9. In a power transmission, a drive mechanism, a gear formed on said drive mechanism, a driven shaft, a toothed member drivingly associated with said driven shaft and axially movable into engagement with said gear, a plurality of shortened teeth on said toothed member, a blocker means for said toothed member comprising a ring positioned on said drive mechanism in frictional engagement therewith and within the periphery of said toothed member, blocker means formed on said ring between said shortened teeth and said gear and adapted to be rotated in front of said teeth to block axial movement thereof, and a limit means formed on said ring and positioned between two teeth of said toothed member.

10. In a power transmission, a drive mechanism, a gear formed on said drive mechanism, a driven mechanism, a toothed member forming a part of said driven mechanism and axially movable into engagement with said gear, shortened teeth formed on said toothed member, a blocker for controlling axial movement of said member comprising a ring positioned on a portion of said drive mechanism, blocking means formed on said ring designed to be moved in front of said shortened teeth, and a limit means formed on said ring adapted to move between two teeth of the toothed member and limiting the movement of said blocking means.

11. In a power transmission, a drive mechanism, a gear formed on said drive mechanism, a driven mechanism, a toothed member forming a part of said driven mechanism and axially movable into engagement with said gear, a plurality of teeth of said toothed member being shortened at their ends, a blocker mounted on said drive mechanism between said gear and said toothed member and comprising a ring positioned on a portion of said drive mechanism, blocking means formed on said ring and designed to selectively rotate around the axis of the drive mechanism to block axial movement of said shortened teeth or mesh therewith, and a limit means formed on said ring designed to move between a plurality of teeth of the toothed member to limit the rotation of said blocking means.

12. In a power transmission, a drive mechanism, a gear formed on said drive mechanism, a driven mechanism, a toothed member forming part of said driven mechanism and axially movable into engagement with said gear, shortened teeth formed on said toothed member, a blocker for controlling axial movement of said member comprising a ring positioned on a portion of said drive mechanism, blocking means formed on said ring designed to be moved in front of said shortened teeth, and a limit means formed on said ring and adapted to limit the movement of said blocking means.

13. In a transmission having a drive shaft and a driven shaft, a clutch member on the drive shaft, a clutch member rotatable with the driven shaft and being movable to engage the clutch member on the drive shaft, a blocking member mounted on one of the shafts and being interposed between said clutch members whereby to block movement of the movable clutch member in one position and permitting movement of said clutch member into engagement with the other clutch member when in another position, said blocking member being comprised of an expansible ring-like structure having an inner diameter normally less than the outer diameter of that portion of the shaft on which the blocking member is mounted and said blocking member being permanently expanded when mounted on the shaft, whereby to provide a substantially constant frictional drag between the blocking member and the shaft portion on which it is mounted.

JOHNSTON STUART VOIGT.

REFERENCES CITED

The following references are of record in the file of this patent:

UNITED STATES PATENTS

| Number | Name | Date |
| --- | --- | --- |
| 1,857,223 | Vincent et al. | May 10, 1932 |
| 2,200,851 | Osborne | May 14, 1940 |
| 2,210,668 | Hopkins | Aug. 6, 1940 |

FOREIGN PATENTS

| Number | Country | Date |
| --- | --- | --- |
| 482,077 | Great Britain | Mar. 23, 1938 |
| 679,189 | France | Jan. 6, 1930 |